United States Patent Office 3,379,899
Patented Apr. 23, 1968

3,379,899
DISTRIBUTOR CIRCUIT FOR A CONTROL RECTIFIER INCLUDING A PULSE GENERATOR
Robert Chauprade, Puteaux, France, assignor to Le Materiel Electrique S.W., Paris, France, a French company
Filed Nov. 17, 1964, Ser. No. 411,886
Claims priority, application France, Nov. 19, 1963, 954,225
3 Claims. (Cl. 307—284)

ABSTRACT OF THE DISCLOSURE

A controlled rectifier has a pulse generator and distributor circuit including a transistor the emitter of which is connected through a rectifier to a power inverter circuit, the base of the transistor being connected to an ignition circuit and the collector of the transistor being connected to the control electrode of the controlled rectifier.

This invention relates to a pulse generator and distributor circuit for a control rectifier and to control rectifier arrangements incorporating such circuits.

In controlled rectifier circuits of the kind, for example, used as static inverters or power amplifiers fed with a one-phase or poly-phase 50–60 cps. power supply, the control pulses are characterised in that the position of the pulse as variable with respect to a synchronisation of reference voltage, which has a fixed relationship with the anode voltage of the controlled rectifier whose opening angle it is required to vary.

The operation of the controlled rectifier is well known; the conditions required for its ignition are that the anode should be positive with respect to the cathode; on ignition and during the conduction period, the load circuit must be such that the anode-cathode current as greater than the striking current and than the maintaining current; to start conduction, the grid or control electrode must receive a positive pulse with respect to the cathode.

The time, amplitude and power of the control pulse are important parameters, and present-day control circuits generally satisfy the ignition conditions for controlled rectifiers, but the development of the applications of silicon controlled rectifiers is such that new conditions have arisen.

Since the number of elements connected in series-parallel groups of controlled rectifiers used as power amplifiers is continually increasing, difficulties arise in connection with multiplication of the pulse generated by a single circuit and the same applies to the electrical isolation required between the various control electrode circuits.

Such groups of controlled rectifiers are formed by components connected in series and in parallel in a single bridge arm.

In the case of parallel circuits the currents are balanced by mutual induction.

In the case of series circuits, if the voltages at the terminals of the controlled rectifiers are required to be equally distributed, the rectifiers must ignite at the same time; if the ignition device generates pulses whose rise time is much in excess of 1 microsecond, i.e. more than the time required for the controlled rectifier to pass from the cut-off state to the conductive state, a special device must be connected to the terminals of each controlled rectifier.

An example of a known device of this type is a pulse amplifier which gives a power extrapolation of the output of conventional ignition circuits.

The principle is known and comprises a flip-flop (controlled by a phase converter) comprising two transistors alternately delivering a recangular wave to the two primary halves of a saturable transformer. Saturation of the transformer determines the width of the pulse at the secondary winding.

This system has the following disadvantages for an increase in power, i.e., if a large number of pulses is required:

(1) The magnetic cores used must be very large.
(2) There is a high current in the transistors because of the saturation of the cores.
(3) Even if the power dissipated inside the amplifier (in the case) is often negligible as compared with the installed power, it nevertheless gives rise to technical problems, such as over-dimensioning of the components making up the pulse amplifier, the volume of the units or cases or ventilation of the latter.
(4) Another consideration is the pulse rise time which is quite considerable, several tens of microseconds, because of the components used. This results in familiar disadvantages as regards series and parallel connections of transistors.

The present invention obviates these disadvantages and satisfies the new conditions mentioned hereinbefore.

According to one aspect of the invention there is provided a pulse generator and distributor circuit for a controlled rectifier comprising a transistor of which the emitter is connected through a rectifier to a power inverter circuit, the base is connected to a ignition circuit and the collector is connected to a terminal for connection to the control electrode of a controlled rectifier.

According to another aspect of the invention there is provided a controlled rectifier arrangement including, for each controlled rectifier a transistor of which the collector is connected to the control electrode of such controlled rectifier, the base is connected to an ignition circuit for the controlled rectifier and the emitter is connected through a rectifier to a power inverter circuit.

The various features and advantages of the invention will be apparent from the following description of an exemplary embodiment illustrated in the accompanying drawings, of which:

Figure 1:
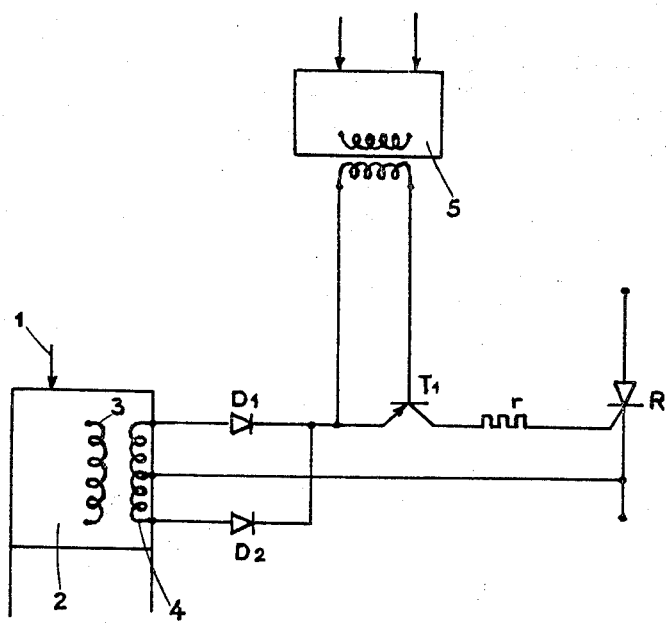
FIGURE 1 is a circuit diagram of an embodiment of the invention.

In the arrangement shown in FIGURE 1, the power required to control $n$ controlled rectifiers R is taken from a D.C. source 1. The D.C. signal is converted to a rectangular A.C. signal by a high-frequency inverter 2, the output of which is connected to the primary 3 of a transformer having a secondary formed by $n$ windings identical to the winding 4 shown in FIGURE 1. The ends of the secondary 4 of the transformer are connected to diodes D1 and D2. The rectified signal obtained at the output of the diodes D1 and D2 is applied to the emitter of a transistor T1, the collector of which is connected to the control electrode of the controlled rectifier R through a resistor $r$, and the base of which is connected to an ignition circuit 5 of known type.

Figure 2A:
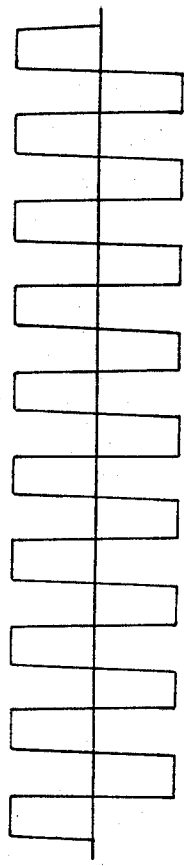
FIGURE 2a shows the rectangular A.C. signal of the inverter output.

FIGURE 2a shows the D.C. signal of the source 1 of the inverter 2 (this source is the same as the source for the ignition circuit 5) at the inverter output. This signal is of a rectangular shape with practically no rise time and isolation is provided by the transformer 3, 4.

Figure 2B:
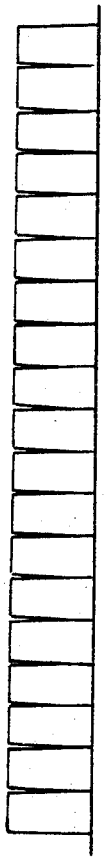
FIGURE 2b shows the signal of FIGURE 2a after rectification.

FIGURE 2b shows the signal after rectification by the diodes D1 and D2 as transmitted by the transistor T1 to the control electrode of the controlled rectifier R when the transistor is driven.

The ignition order for the controlled rectifier R is given by the ignition circuit 5. Transistor T1 delivers positive pulses "0" or "1" to the control electrode of the rectifier R and the presence, frequency and time of these pulses depend upon logical signals from the ignition circuit 5.

Figure 2C:
FIGURE 2c is the signal obtained at the output of the device according to the invention and used to drive the control electrode of a controlled rectifier.

FIGURE 2c shows the control pulses transmitted to the controlled rectifier R.

The system shown in FIGURES 1 and 2 is a controlled rectifier ignition system wherein the pulses obtained are rapid, exact, calibrated and regular. It facilitates series connection of controlled rectifiers because of the speed at which the ignition pulses are produced.

Ferrites, relatively simple high band-pass materials, can be used because of the ignition techniques employed, and no power pulse transformers which are difficult to design and expensive, are required.

The system also enables controlled rectifiers to be grouped and a large number of pulses to be delivered while facilitating series connection because of the speed at which the ignition pulse is produced.

Where a large number of controlled rectifiers are grouped, for example in rectifier bridges, each controlled rectifier is given an identical circuit to that shown in FIGURE 1.

What I claim is:

1. A pulse generator and distributor circuit for control circuits of controlled rectifiers comprising for each controlled rectifier a power inverter circuit and a separate ignition circuit and a transistor of which the emitter is connected through a rectifier to said power inverter circuit, the base is connected to said ignition circuit and the collector is connected to the control electrode of the controlled rectifier.

2. A controlled rectifier arrangement including, for each controlled rectifier a transistor of which the collector is connected to the control electrode of such controlled rectifier, the base is connected to an ignition circuit for the controlled rectifier and the emitter is connected through a rectifier to a separate power inverter circuit.

3. An arrangement as claimed in claim 2 wherein each controlled rectifier is a silicon controlled rectifier.

References Cited

UNITED STATES PATENTS

| | | | |
|---|---|---|---|
| 3,242,420 | 3/1966 | Ulrey | 323—58 |
| 3,310,714 | 3/1967 | Gargani | 323—22 |
| 3,316,482 | 4/1967 | McVey | 323—22 |
| 3,331,362 | 7/1967 | Mitchell | 307—88.5 XR |
| 3,084,325 | 4/1963 | Morris et al. | 323—22 X |
| 3,133,241 | 5/1964 | White | 321—45 |
| 3,200,258 | 8/1965 | Carroll | 307—88.5 |
| 3,201,599 | 8/1965 | Baker | 307—88.5 |
| 3,260,924 | 7/1966 | Bridgeman | 323—18 |
| 3,265,955 | 8/1966 | Brown | 323—22 |
| 3,284,695 | 11/1966 | Weisz | 323—22 |
| 3,309,602 | 3/1967 | Euvino et al. | 321—46 |

JOHN F. COUCH, *Primary Examiner.*

WARREN E. RAY, *Examiner.*

W. M. SHOOP, *Assistant Examiner.*